US012397556B2

(12) United States Patent
Morikawa

(10) Patent No.: US 12,397,556 B2
(45) Date of Patent: Aug. 26, 2025

(54) LIQUID CONTAINER

(71) Applicant: CANON KABUSHIKI KAISHA, Tokyo (JP)

(72) Inventor: Tomoki Morikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 18/320,151

(22) Filed: May 18, 2023

(65) Prior Publication Data

US 2023/0382120 A1 Nov. 30, 2023

(30) Foreign Application Priority Data

May 31, 2022 (JP) ................................ 2022-088866

(51) Int. Cl.
*B41J 2/175* (2006.01)

(52) U.S. Cl.
CPC ......... *B41J 2/17513* (2013.01); *B41J 2/1752* (2013.01); *B41J 2002/17516* (2013.01)

(58) Field of Classification Search
CPC ...... B41J 2/175; B41J 2/1706; B41J 2/17509; B41J 2/17513; B41J 2/1752; B41J 2/17523; B41J 2/17553; B41J 2002/17516
See application file for complete search history.

(56) References Cited

U.S. PATENT DOCUMENTS

| | | | | | |
|---|---|---|---|---|---|
| 6,010,210 | A * | 1/2000 | Wilson | B41J 2/17513 | 347/85 |
| 2003/0067522 | A1* | 4/2003 | Kaga | B41J 2/17553 | 347/86 |
| 2015/0273501 | A1* | 10/2015 | Naito | B41J 2/1752 | 239/373 |
| 2018/0258300 | A1* | 9/2018 | Miyake | C09D 11/107 | |

FOREIGN PATENT DOCUMENTS

| | | |
|---|---|---|
| JP | 2018-153949 | 10/2018 |

* cited by examiner

*Primary Examiner* — Anh T Vo
(74) *Attorney, Agent, or Firm* — Venable LLP

(57) ABSTRACT

A liquid container being able to be detachably attached to a liquid ejecting device and supplying a liquid to the liquid ejecting device is provided, the liquid container including: a bag member having an accommodating portion, which accommodates the liquid inside and has flexibility, and a supply port which supplies the liquid in the accommodating portion to the liquid ejecting device; and a positioning member fixed to the bag member and positioned with respect to the liquid ejecting device, wherein the bag member further has a handle portion.

5 Claims, 9 Drawing Sheets

LIQUID CONTAINER

BACKGROUND OF THE INVENTION

Field of the Invention

The present invention relates to a liquid container which supplies a liquid to a liquid ejecting device.

Description of the Related Art

As an aspect of a liquid container which contains a liquid to be supplied to a liquid ejecting device, a so-called ink pack is known (Japanese Patent Application Publication No. 2018-153949, for example). The ink pack contains a liquid such as ink to be supplied to an inkjet printer (hereinafter, also referred to simply as a "printer"), which is an aspect of a liquid ejecting device, in a container such as a bag-shaped member having flexibility.

Some of the printers to which the ink pack is attached include a case in which the ink pack is disposed. In the printer as above, a supply path of the ink between the ink pack and the printer and an electrical communication path are established by disposing the ink pack in a case, such as a cassette, and by attaching the ink pack, together with the case, to the printer.

Japanese Patent Application Publication No. 2018-153949 discloses a constitution of a liquid container including a bag member which accommodates a liquid such as ink and a connecting member connected to the bag member and positioned with respect to the case. Moreover, the connecting member has a handle portion provided in order to improve handling performance when the liquid container is mounted in the case.

SUMMARY OF THE INVENTION

However, in the constitution in which the handle and the like are provided on the connecting member, the number of components constituting the connecting member increases, and a size of the connecting member becomes larger. Then, in order to accommodate the liquid container in the case, the size of the bag-shaped member needs to be reduced in accordance with the size increase of the connecting member, and accommodation efficiency of the liquid drops. In addition, since the connecting member is constituted by many molded products such as a rotating shaft, a handle portion and the like, manufacturing costs rise.

The present invention has been made in view of the above problems and has an object to provide a liquid container with a simple constitution and high liquid accommodation efficiency.

In order to solve the above problems, the liquid container according to the present invention comprises:

a bag member having an accommodating portion, which accommodates therein the liquid and has flexibility, and a supply port which supplies the liquid in the accommodating portion to the liquid ejecting device; and a positioning member fixed to the bag member and positioned with respect to the liquid ejecting device, wherein the bag member further has a handle portion.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

First Embodiment

A liquid container according to the present invention can be applied to a printer, a copier, and a facsimile device as a liquid ejecting device. In this embodiment, the liquid container used for the liquid ejecting device of an inkjet recording method using ink as the liquid is explained as an example, but the liquid is not limited to ink in application of the present invention.

Figure 1:
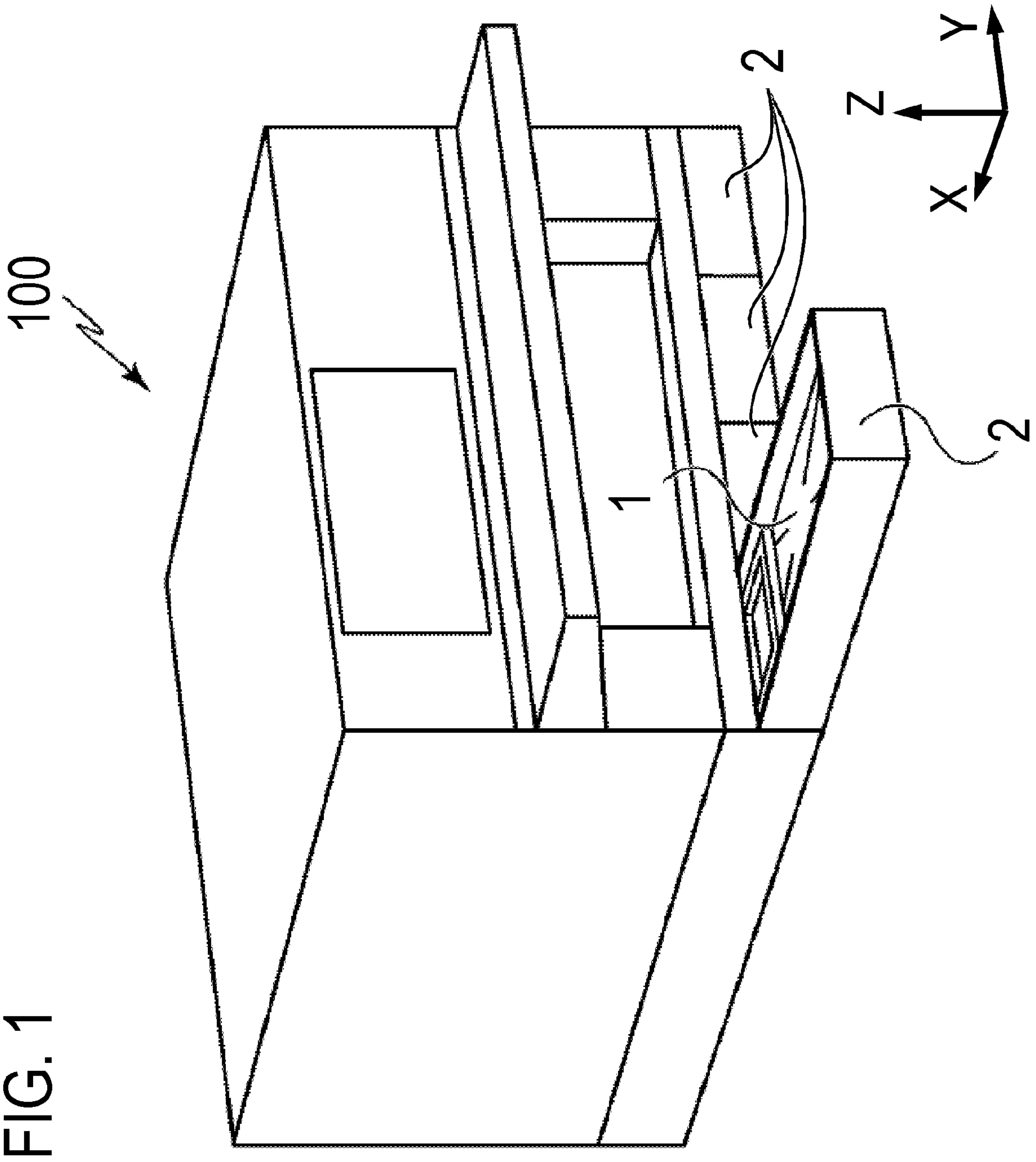
FIG. 1 is a perspective view of a liquid ejecting device in which a liquid container according to a first embodiment is mounted.

Hereinafter, a first embodiment of the present invention will be explained. FIG. 1 is a perspective view schematically illustrating a liquid ejecting device 100 in which a liquid container 1 according to the first embodiment is mounted. The liquid ejecting device 100 includes a recording head, an accommodating portion of a recording medium, a conveyance mechanism of the recording medium (these are not shown) and the like. In the liquid ejecting device 100, the liquid container 1 as an ink pack accommodated in a cassette 2 is mounted. The cassette 2 is a case detachably attached to a main body of the liquid ejecting device 100, and by attaching the cassette 2 to the liquid ejecting device 100 in a state in which the liquid container 1 is mounted, the liquid in the accommodating portion of the liquid container 1 can be supplied to the liquid ejecting device 100.

In the following explanation and drawings, an X-direction, a Y-direction, and a Z-direction are defined as follows. The X-direction is a longitudinal direction of the liquid container 1, in which the liquid container 1 and the cassette 2 are inserted into/removed from the liquid ejecting device 100, when the liquid container 1 is attached to/detached from the liquid ejecting device 100. The Y-direction is a width direction of the liquid container 1, and the Z-direction is a thickness direction of the liquid container 1. In this embodiment, the X-direction, the Y-direction, and the Z-direction are orthogonal to one another. In the following explanation, a state where the liquid container 1 is mounted in the liquid ejecting device 100 is called a mounted state. In the mounted state, the liquid container 1 is mounted in the liquid ejecting device 100 with the thickness direction in parallel to a vertical direction.

FIG. 1 is a perspective view of the liquid ejecting device 100 in which the liquid container 1 according to the first embodiment is mounted. The liquid ejecting device 100 includes a recording head, an accommodating portion of a recording medium, a conveyance mechanism of the recording medium (these are not shown) and the like, and the cassette 2 is provided capable of attachment/detachment. When the cassette 2 is inserted into and attached to the liquid ejecting device 100 in the X-direction in the state where the liquid container 1 is accommodated in the cassette 2, the liquid container 1 is mounted in the liquid ejecting device 100.

The liquid container 1 accommodates ink to be ejected from the recording head of the liquid ejecting device 100. In this embodiment, four pieces of the liquid containers 1 accommodating ink in each of colors cyan (C), magenta (M), yellow (Y), and black (K) are accommodated in the cassettes 2, respectively, and mounted in the liquid ejecting device 100. The four cassettes 2 are attached to the liquid ejecting device 100 adjacently in the width direction (Y-direction) of the liquid container 1. Sizes of the four liquid containers 1 of this embodiment are the same, but in application of the present invention, the liquid container 1 for the black ink, for example, may be made larger than the liquid containers 1 for the ink in the other colors. Moreover, the present invention can be also applied to a monochrome printer in which the liquid container for the ink only in one color is mounted or the like.

Figure 2:
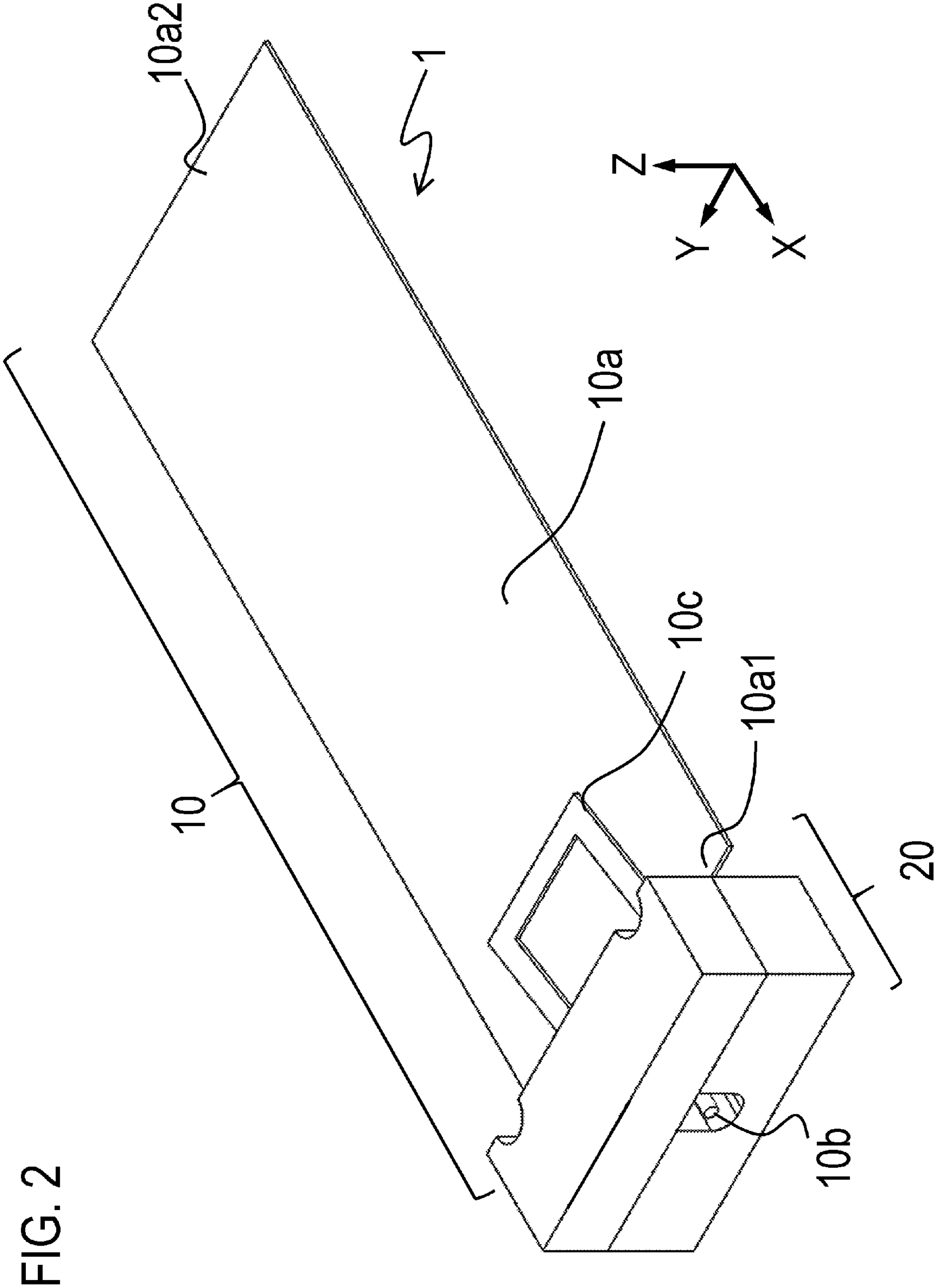
FIG. 2 is a perspective view of the liquid container according to the first embodiment.

FIG. 2 is a perspective view of the liquid container 1 attached to the cassette 2. The liquid container 1 of this embodiment is constituted by a bag member 10 accommodating ink inside and an adaptor 20 positioned with respect to the cassette 2. The bag member 10 is fixed to the adaptor 20, and the bag member 10 and the adaptor are provided adjacently in a longitudinal direction of the liquid container 1. When the cassette 2 is attached to the liquid ejecting device 100 in a state where the adaptor 20 is positioned with respect to the cassette 2, the liquid container 1 is connected to the liquid ejecting device 100, and the liquid in the bag member 10 can be supplied to the liquid ejecting device 100. That is, the adaptor 20 is a member for improving handling when the liquid container 1 is connected to the cassette 2 and the liquid ejecting device 100 and is a positioning member which is positioned with respect to the liquid ejecting device 100.

The bag member 10 has a bag-shaped accommodating portion 10*a* having flexibility, a supply port 10*b* provided at an end portion in the longitudinal direction of the accommodating portion 10*a*, and a handle portion 10*c* for an operator to grasp. Ink in which a pigment as a sedimentation component is diffused in a solvent is accommodated in the accommodating portion 10*a* of this embodiment, but in application of the present invention, types of the liquids to be accommodated in the accommodating portion 10*a* are not limited to that. The accommodating portion 10*a* shown in FIG. 2 is in a state not accommodating the ink, and when the ink is filled, the accommodating portion 10*a* swells.

The ink accommodated in the accommodating portion 10*a* is supplied to the liquid ejecting device 100 through the supply port 10*b*. The supply port 10*b* extends in the longitudinal direction (X-direction) of the liquid container 1, that is, an attachment/detachment direction of the liquid container 1 and the cassette 2 with respect to the liquid ejecting device 100, and a supply direction of the ink from the bag member to the liquid ejecting device 100 is in parallel to the attachment/detachment direction.

In the bag member 10, a first end portion 10*a*1 in which the supply port 10*b* of the accommodating portion 10*a* is provided in the longitudinal direction is connected to the adaptor 20. A second end portion 10*a*2 on a side opposite to the first end portion is not fixed to the adaptor 20. The handle portion 10*c* extends from the first end portion 10*a*1 side to the second end portion 10*a*2 side of the accommodating portion 10*a* by opposing the accommodating portion 10*a*. Since the operator can grip the handle portion 10*c* for the operation when mounting the liquid container 1 on the cassette 2 or removing it from the cassette 2, workability is favorable.

Moreover, the handle portion 10*c* extends in a direction gradually separated from the accommodating portion 10*a* as it gets closer to the second end portion 10*a*2 from the first end portion 10*a*1 in the longitudinal direction of the liquid container 1. That is, the handle portion 10*c* is disposed so that one end is fixed to the first end portion 10*a*1 of the accommodating portion 10*a*, and a clearance is given with respect to the accommodating portion 10*a*. By having such a constitution that the handle portion 10*c* has the clearance with respect to the accommodating portion 10*a* as above, a hand can be inserted into a space between the handle portion 10*c* and the accommodating portion 10*a*, and the handle portion 10*c* can be gripped easily.

The adaptor 20 has an electric connection portion (not shown) to be electrically connected to the liquid ejecting device 100. When the liquid container 1 is attached together with the cassette 2 to the liquid ejecting device 100, the adaptor 20 is electrically connected to the liquid ejecting device 100, and the ink can be supplied from the bag member 10 to the liquid ejecting device 100.

Figure 3:
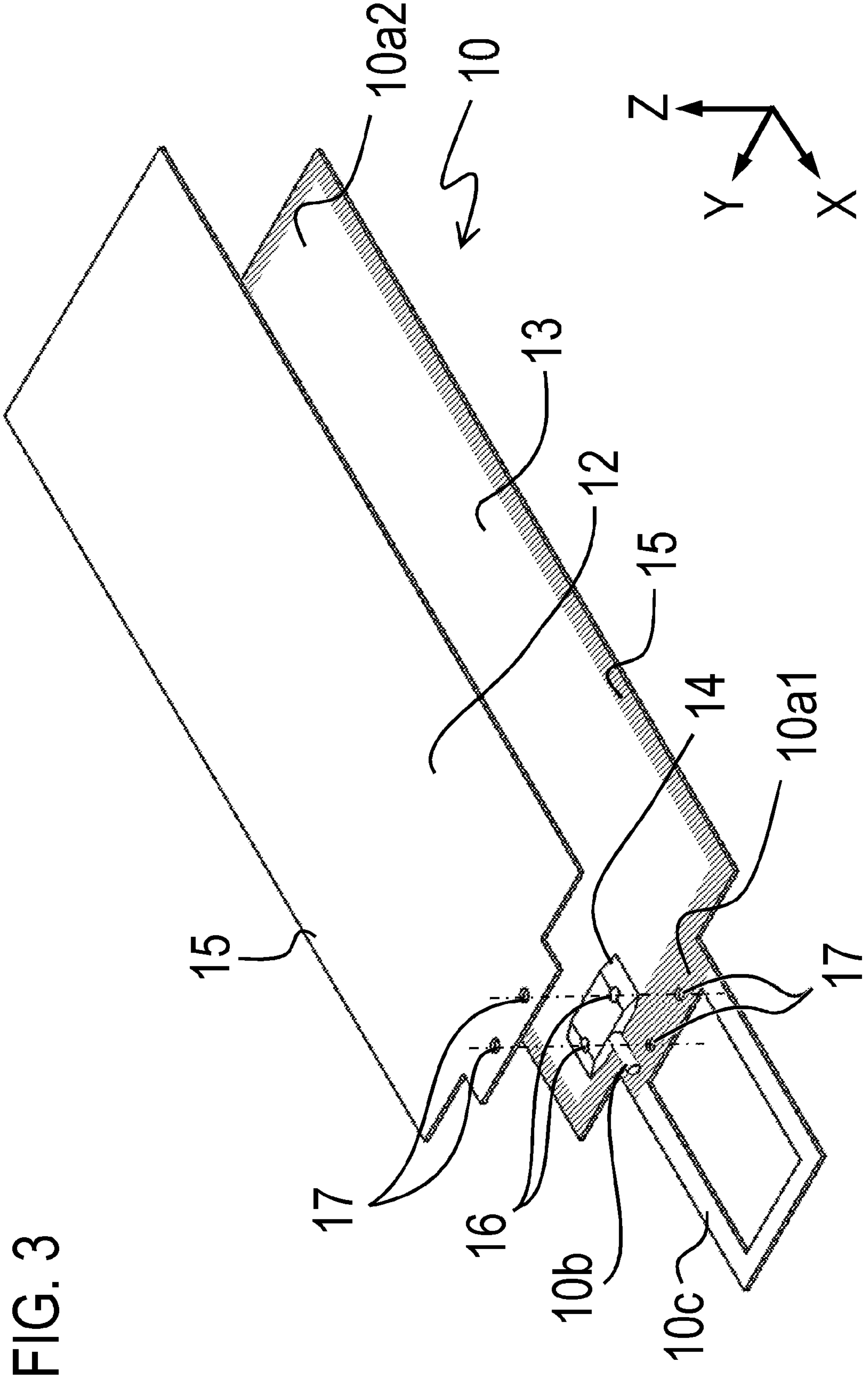
FIG. 3 is an exploded perspective view of a bag member according to the first embodiment.

FIG. 3 is an exploded perspective view illustrating a constitution of the bag member 10. The accommodating portion 10*a* of this embodiment is a pillow-type bag formed by placing an upper film 12 over a lower film 13, each having a substantially rectangular shape, so that they are welded and bonded to each other on a welding portion 15 on opposing surfaces thereof. The welding portion 15 as a bonding region is outer peripheral portions of the upper film 12 and the lower film 13 excluding a portion constituting the handle portion 10*c*, and an accommodating region surrounded by the welding portion 15 forms an accommodating space for accommodating the ink. In FIG. 3, in order to explicitly indicate the region of the welding portion 15, the welding portion 15 is shown with hatching. The shape of the accommodating portion of the bag member may be either one of the pillow type and a gazette type with gore, and the shape thereof is not limited as long as the liquid such as ink can be accommodated and can be contained in the cassette 2. Moreover, the bag member 10 of this embodiment is constituted by two pieces of sheet-state members, that is, the lower film 13 as a first sheet-shaped member and the upper film 12 as a second sheet-shaped member, but application of the present invention is not limited to that. For example, it may be such a constitution that one piece of the sheet-shaped member is folded, and the outer peripheral portion is bonded so that the accommodating space for the liquid is formed inside.

The lower film 13 as the first sheet-shaped member and the upper film 12 as the second sheet-shaped member constituting the bag member 10 only need to be formed of a material having flexibility and gas-barrier characteristics. The material used for each of the sheet-shaped members includes polyethylene terephthalate (PET), nylon, polyethylene, and the like, for example. Moreover, the upper film 12 and the lower film 13 may be a film with a laminated structure in which a plurality of films constituted by these materials are laminated. When the laminated structure is adopted, such a constitution is considered that an outer layer is formed of PET or nylon, which is excellent in impact resistance, and an inner layer is formed of polyethylene, which is excellent in ink resistance, for example. In addition, as a layer included in the laminated structure, a layer on which aluminum or the like is vapor-deposited may be included.

The bag member 10 has a spout portion 14 as a supply port member having the supply port 10*b* bonded between the two sheet-shaped members, that is, the upper film 12 and the lower film 13. That is, the bag member 10 is manufactured such that a welding portion 15 is welded in a state where the spout portion 14 is sandwiched by the upper film 12 and the lower film 13. At this time, the spout portion 14 is sandwiched by the upper film 12 and the lower film 13 so that the provided supply port 10*b* communicates between the accommodating space and an outside of the bag member 10. Moreover, two spout holes 16 provided in the spout portion 14 and two film holes 17 provided in each of the upper film 12 and the lower film 13 are overlapped and penetrate in a thickness direction of the bag member 10. The bag member 10 is fixed to the adaptor 20 by the spout hole 16 and the film hole 17 provided in the bag member 10. A diameter of the film hole 17 only needs to be formed larger than the diameter of the spout hole 16 and only needs to be in a mode not preventing engagement between the bag member 10 and the adaptor 20. Moreover, the spout portion 14 in this embodiment is formed of a plastic material, but the material of the spout portion 14 is not limited to that.

The ink supply into the accommodating portion 10*a* formed by the upper film 12 and the lower film 13 is performed after the upper film 12 and the lower film 13 are welded. The supply port 10*b* of the spout portion 14 has a valve provided so that the ink flows only in a direction of supply from the accommodating portion 10*a* to the liquid ejecting device 100. Thus, when the ink is to be injected into the accommodating portion 10*a*, the ink is injected through an injection port (not shown) provided in the spout portion 14, and the injection port is sealed after that.

From the first end portion 10*a*1 side of the lower film 13, the handle portion 10*c* extends in the longitudinal direction of the bag member 10, and the handle portion 10*c* is provided on the lower film 13 integrally. The lower film 13 is a flat sheet of film, and in a state not connected to the adaptor 20, the handle portion 10*c* extends from the first end portion 10*a*1 of the accommodating portion 10*a* in a direction gradually separated from the accommodating portion 10*a*. The handle portion 10*c* has an opening having a rectangular shape opened in the thickness direction formed in the rectangular film, and the shape is easily gripped by the operator. The shape of the handle portion 10*c* is not limited to that and may be a shape with a rounded corner portion or a shape without a hole formed, for example. Moreover, the handle portion 10*c* in this embodiment is provided on the lower film 13, but it may be so constituted that the handle portion 10*c* is provided on the upper film 12.

Figure 4B:
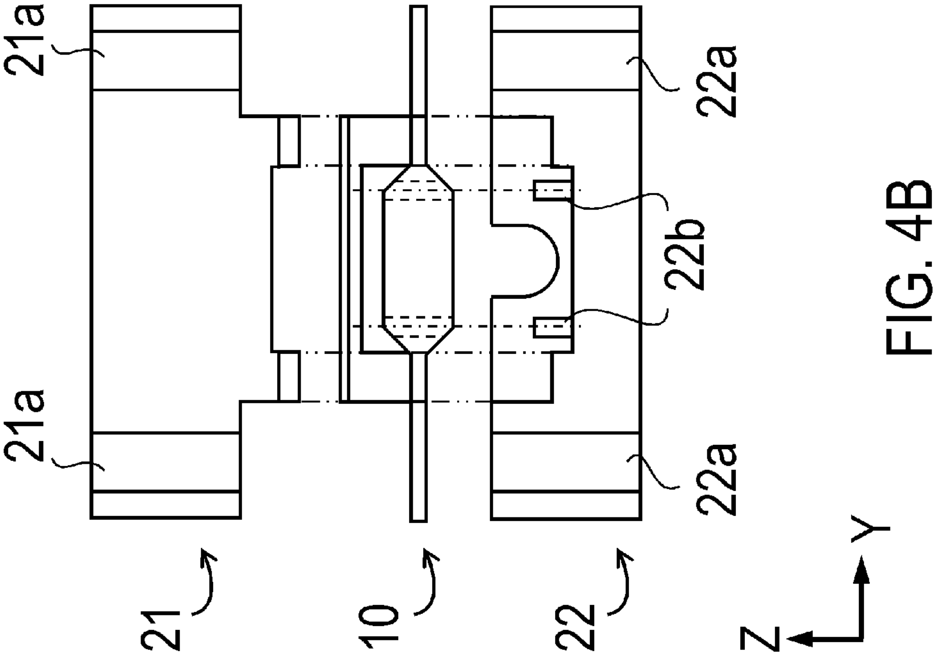
FIGS. 4A and 4B are exploded views of the liquid container according to the first embodiment.
Figure 4A:
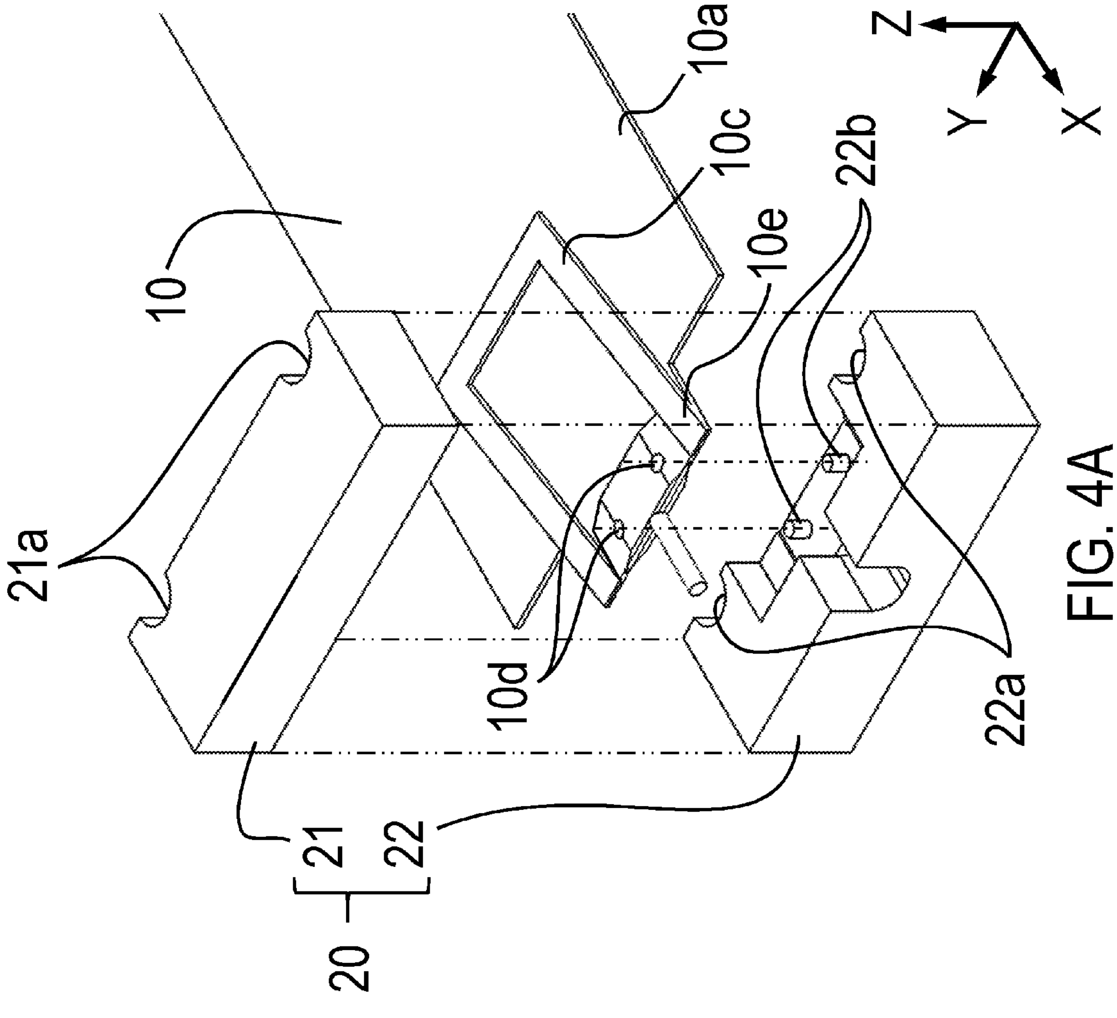

FIG. 4A is an exploded perspective view illustrating a constitution of the liquid container 1, and FIG. 4B is an exploded rear view illustrating the constitution of the liquid container 1 when viewed from a side opposite to the supply port side. The adaptor 20 as the positioning member is constituted by two members, that is, an upper adaptor 21 and a lower adaptor 22.

In an adjacent direction of the bag member 10 and the adaptor 20 (longitudinal direction of the liquid container 1), two depressed portions 21*a* recessed from the end portion on the bag member side to the adaptor side are provided on the upper adaptor 21. The depressed portion 21*a* of this embodiment has a semicircular shape when viewed from the thickness direction and has a groove shape extending by penetrating in the thickness direction. Moreover, two depressed portions 22*a* are provided similarly on the lower adaptor 22, too. When the upper adaptor 21 and the lower adaptor 22 are engaged, the depressed portions 21*a* and 22*a* are disposed by overlapping when viewed from the thickness direction, and the depressed portions 21*a* and 22*a* are used for positioning of the liquid container 1 with respect to the cassette 2. Moreover, the upper adaptor 21 and the lower adaptor 22 of this embodiment are formed of a plastic material, but the material is not limited to that.

The bag member 10 is fixed to the adaptor 20 by being sandwiched by the upper adaptor 21 and the lower adaptor 22. At this time, in a state where the lower film 13 is folded so that the handle portion 10*c* is opposed to a surface of the upper film 12 forming an outer surface of the accommodating portion 10*a*, the bag member 10 is sandwiched by the upper adaptor 21 and the lower adaptor 22. In other words, the handle portion 10*c* is provided on the lower film 13 by being contiguous with the accommodating portion 10*a* through a folded portion 10*e*.

The bag member 10 is fixed to the adaptor 20 by engagement between an engagement hole 10*d* constituted by the spout hole 16 and the film hole 17 and a protruding portion 22*b* provided on the lower adaptor 22 and extending in the thickness direction. In a state where the handle portion 10*c* of the bag member 10 is folded, the protruding portion 22*b* is inserted through the spout hole 16 and the film hole 17, and the bag member 10 is sandwiched by the upper adaptor 21 and the lower adaptor 22 so that the liquid container 1 is formed. Moreover, the upper adaptor 21 and the lower adaptor 22 are connected to each other by engagement between an engaging portion and an engaged portion, not shown. The engaging portion and the engaged portion only need to be a claw portion and a depressed portion in which the claw portion is fitted or the like, for example.

Figures 5A, 5B, 5C:
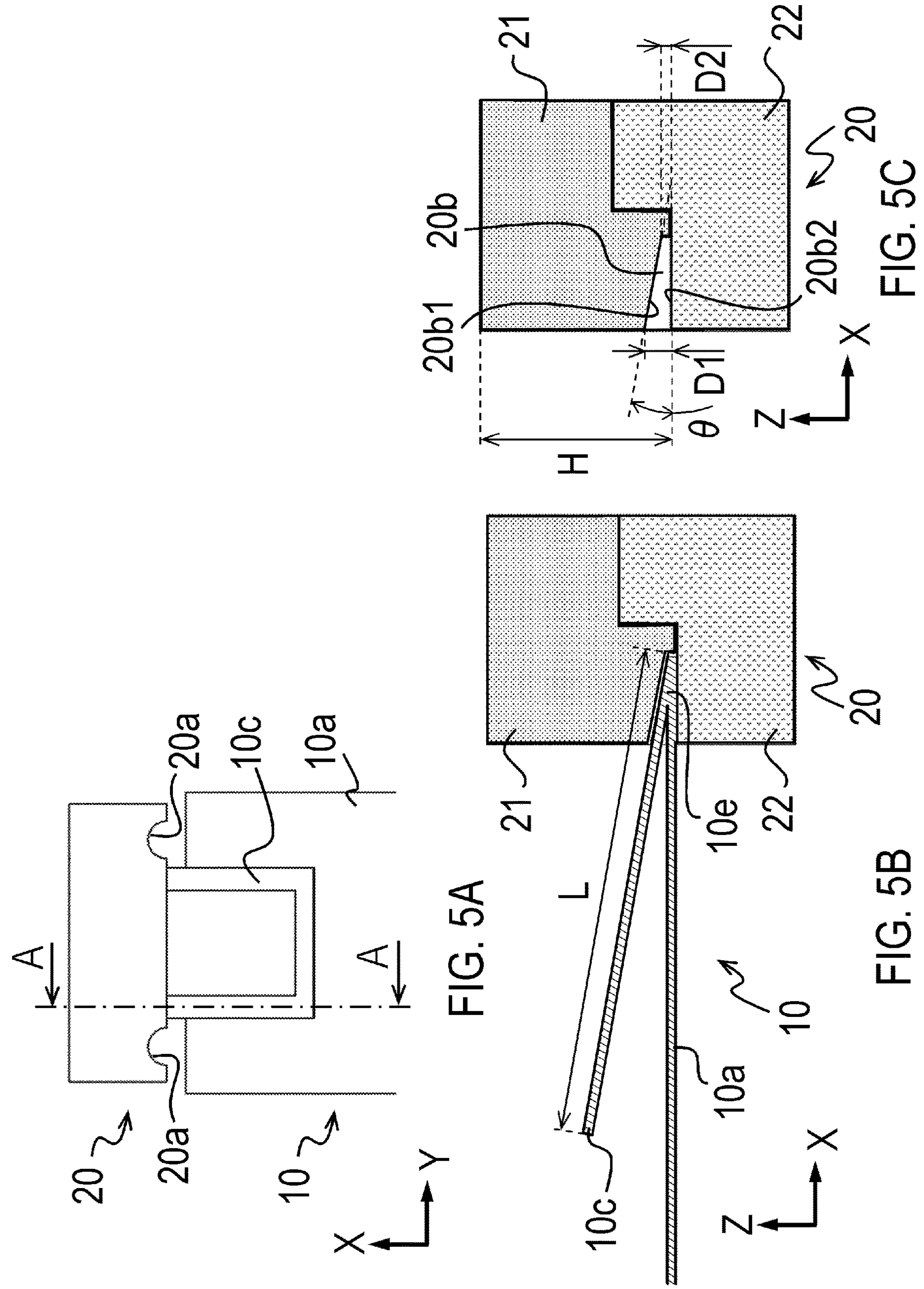
FIGS. 5A to 5C are views illustrating constitutions of a handle portion and a clearance portion according to the first embodiment.

FIG. 5A is a top view illustrating peripheral portions of the adaptor 20 and the handle portion 10*c* of the liquid container 1. FIG. 5B is an A-A sectional view of FIG. and illustrates a detailed constitution of the handle portion 10*c*. FIG. 5C is a sectional view illustrating a detailed constitution of the adaptor 20 excluding the bag member 10 from the FIG. 5B.

In the adaptor 20, a depressed portion 20*a* constituted by the depressed portion 21*a* of the upper adaptor 21 and the depressed portion 22*a* of the lower adaptor 22 is provided. In the ink supply direction from the liquid container 1 to the liquid ejecting device 100 (longitudinal direction of the liquid container 1), the depressed portion 20*a* is provided in the end portion on an upstream side of the adaptor 20 and has a groove shape extending in a direction perpendicular to the thickness direction.

Moreover, as shown in FIG. 5C, in the adaptor 20, a clearance portion 20*b* as a space in which the folded portion 10*e* of the bag member 10 is disposed is formed between the upper adaptor 21 and the lower adaptor 22. As shown in FIG. 5B, when the bag member 10 is engaged with the adaptor 20, parts of the folded portion 10*e* and the handle portion 10*c* of the bag member 10 are positioned in the clearance portion 20*b*.

As a surface for forming the clearance portion 20*b*, the adaptor 20 has an upper surface 20*b*1 and a lower surface 20*b*2 as opposing surfaces opposing so as to sandwich the folded portion 10*e* and a region in the vicinity thereof in an opposing direction of the accommodating portion 10*a* and the handle portion 10*c*. The upper surface 20*b*1 is a surface in contact with the region in the vicinity of the folded portion 10*e* of the handle portion 10*c*, and the lower surface 20*b*2 is a surface in contact with the region in the vicinity of the folded portion 10*e* of the lower film 13. In this embodiment, the lower surface 20*b*2 extends horizontally, and the upper surface 20*b*1 is inclined by an inclination angle θ with respect to the lower surface 20*b*2. And an opposing gap between the upper surface 20*b*1 and the lower surface 20*b*2 becomes wider as it goes from the first end portion 10*a*1 to the second end portion 10*a*2. The handle portion 10*c* is urged in a direction brought into contact with the upper surface 20*b*1 by a force (restoring force of the material constituting the bag member 10) of the folded portion 10*e* of the bag member 10 to return to straight and thus, it is disposed so as to follow the upper surface 20*b*1, and a folding-back angle of the handle portion 10*c* is regulated by the inclination angle θ. By constituting as above, when the bag member 10 is fixed to the adaptor 20, such a posture can be maintained that the handle portion 10*c* extends so as to gradually separate from the accommodating portion 10*a* as it goes from the first end portion 10*a*1 side to the second end portion 10*a*2 side. Therefore, by disposing the folded portion 10*e* in the clearance portion 20*b*, the handle portion 10*c* is not crushed by the upper adaptor 21 and the lower adaptor 22 but the handle portion 10*c* is provided so as to have a gap with respect to the accommodating portion 10*a*. That is, since the handle portion 10*c* is disposed so as to slightly float in the thickness direction (Z-direction) with respect to the accommodating portion 10*a*, the operator can insert the hand between the handle portion 10*c* and the accommodating portion 10*a* and grip the handle portion 10*c* easily, which can realize the constitution with excellent handling performance.

As described above, the clearance portion 20*b* of the adaptor 20 is formed in conformance with the folded portion 10*e* of the bag member 10. As shown in FIG. 5C, when seen on a section orthogonal to a width direction (Y-direction) of the liquid container 1, a sectional shape of the clearance portion 20*b* is substantially a trapezoid, and a width of the clearance portion 20*b* in the thickness direction of the bag member 10 becomes larger as it gets closer to an opening side (the bag member 10 side). That is, assuming that the width on the opening side of the clearance portion 20*b* is D1, and a width on a depth side farthest from the opening is D2, the sectional shape of the clearance portion 20*b* is preferably a trapezoid of D1>D2. In this embodiment, the sectional shape of the clearance portion 20*b* is a trapezoid by considering manufacture difficulty and functionality, but it may be a triangle of D2=0, and the surface on which the clearance portion 20*b* is formed does not necessarily have to be a plane.

Moreover, when the handle portion 10*c* is excessively long or is excessively separated from the accommodating portion 10*a*, there is a possibility that the handle portion 10*c* protrudes from the cassette 2, interferes at attachment of the liquid ejecting device 100, and causes nonconformity. Thus, assuming that a length of the handle portion 10*c* is L, a height from the lower surface 20*b*2 of the clearance portion 20*b* (insertion position of the bag member 10) to an upper end of the upper adaptor 21 is H, and the inclination angle of the clearance portion is θ, θ is preferably smaller than $\sin^{-1}$ (H/L). By constituting them so as to satisfy $\theta<\sin^{-1}$ (H/L) as above, the end portion of the handle portion 10*c* does not protrude from the upper surface of the upper adaptor 21, and the interference of the handle portion 10*c* when the liquid container 1 is mounted on the cassette 2 and is inserted into/removed from the liquid ejecting device 100 can be avoided.

Figure 6:
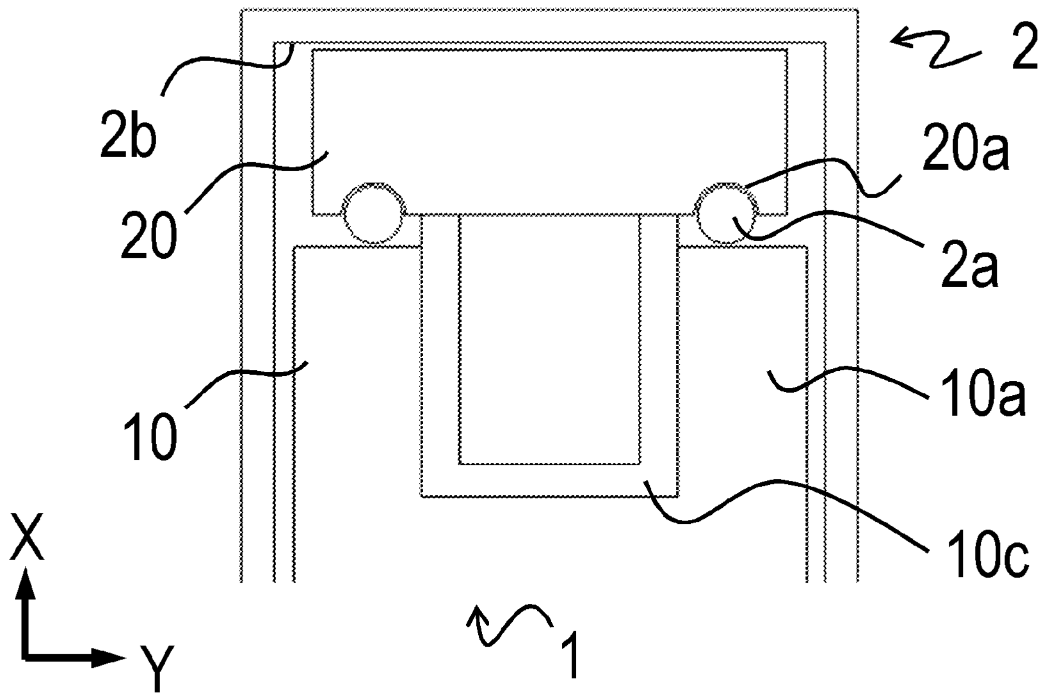
FIG. 6 is a top view of a state in which the liquid container according to the first embodiment is mounted on a cassette.

FIG. 6 is a top view partially illustrating a state where the liquid container 1 is mounted on the cassette 2. The liquid container 1 is mounted on the cassette 2 so that the handle portion 10*c* of the bag member 10 is directed to an upper side in the vertical direction and to the opening side of the cassette 2. Moreover, the liquid container 1 is mounted on the cassette 2 so that a contact surface of the liquid container 1 with respect to the cassette 2 is perpendicular to the thickness direction of the liquid container 1. Therefore, when the liquid container 1 is mounted on the cassette 2 or when the liquid container 1 is removed from the cassette 2, the operator can perform setting on the cassette 2 while gripping the handle portion 10*c*, which is favorable in operability. In this constitution, the cassette 2 has two positioned portions 2*a* each having a columnar shape extending so as to protrude in the thickness direction (Z-direction) from a bottom surface, and the liquid container 1 is accommodated in a portion surrounded by an inner wall 2*b*. The positioning in the width direction (Y-direction) of the liquid container 1 with respect to the cassette 2 is performed by engagement between the depressed portion 20*a* of the liquid container 1 and the positioned portion 2*a* of the cassette 2. Moreover, the positioning in the longitudinal direction (X-direction) of the liquid container 1 with respect to the cassette 2 is performed by sandwiching of the adaptor 20 between the positioned portion 2*a* and the inner wall 2*b* of the cassette 2. In this embodiment, since the depressed portion 20*a* is formed having a semicircular shape on the end portion of the adaptor 20, as compared with a case where the positioning portion is formed having a circular shape in the vicinity of a center portion, the adaptor can be constituted smaller, which results in space saving. The constitutions of the positioning portion and the positioned portion are not limited to that, and the sectional shapes of the positioning portion and the positioned portion do not have to be circular but may be polygonal, for example.

When the ink in the bag member 10 becomes empty, the cassette 2 is pulled out of the liquid ejecting device 100, and the liquid container 1 is removed from the cassette 2. In the removing work of the liquid container 1, the operator can perform the work while gripping the handle portion 10*c* extending in the thickness direction, which is favorable in operability. As the new liquid container 1 to be attached to the cassette 2, by disassembling the adaptor 20, only the bag member 10 replaced with the new bag member 10 into which the ink was injected may be used or the new liquid container 1 which was replaced with the whole adaptor 20 may be used.

As described above, by means of the constitution of this embodiment, by forming the handle portion 10*c* on the bag member 10 so as to be integrated with the accommodating portion 10*a*, as compared with a case in which the handle portion is provided on the adaptor 20, the liquid container 1 can be manufactured with a simple constitution. That is, since there is no need to manufacture the adaptor 20 of the liquid container 1 by combining a large number of molded products, a manufacturing cost can be reduced. In addition, since size reduction of the adaptor 20 of the liquid container 1 can be promoted, an increase in a size of the accommodating portion 10*a* can be expected and thus, improvement of accommodation efficiency of the ink can be promoted.

Second Embodiment

Subsequently, a second embodiment according to the present invention will be explained. The second embodiment is different from the first embodiment in a point that the handle portion is constituted by an upper film 32 and a lower film 13. In the following explanation, portions different from the first embodiment will be mainly explained, while the same or similar members as those in the first embodiment are given the same signs, and the explanation will be omitted.

Figure 7:
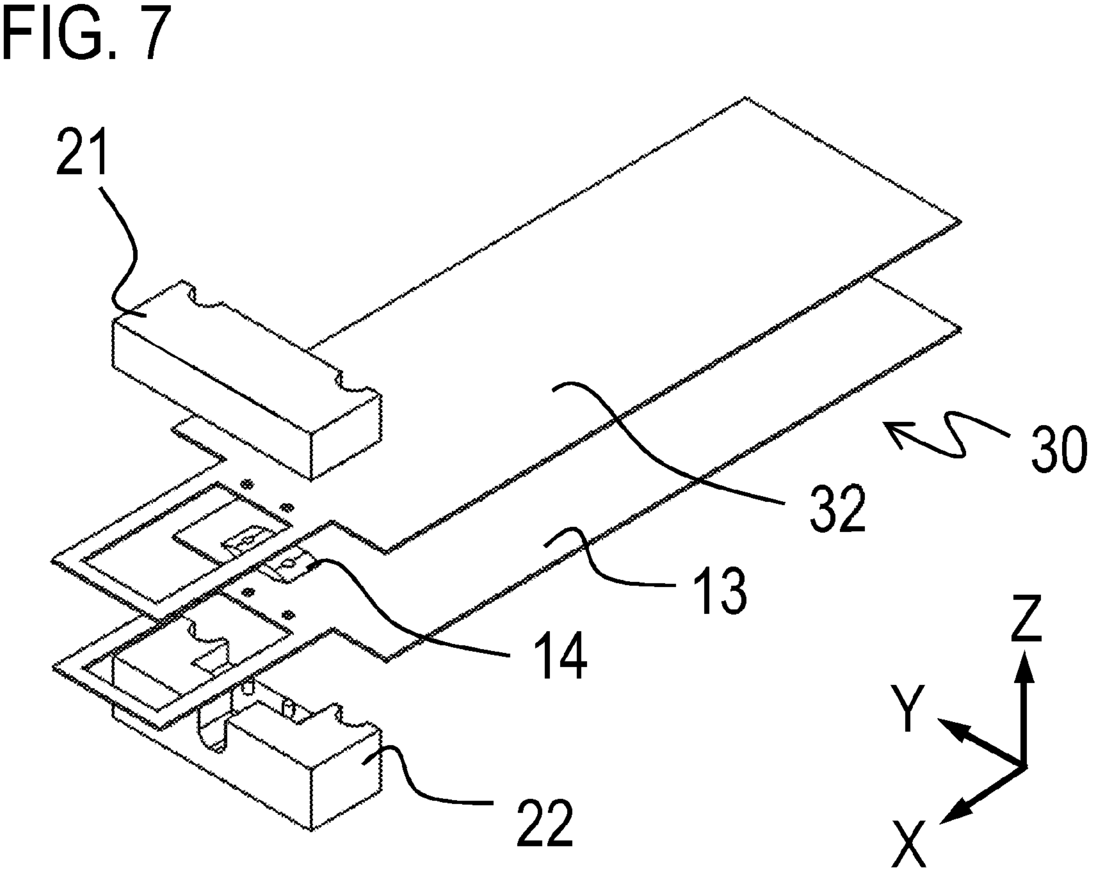
FIG. 7 is an exploded perspective view of a liquid container according to a second embodiment.

FIG. 7 is an exploded perspective view of the liquid container 1 according to the second embodiment. The adaptor 20 provided in the liquid container 1 of this embodiment is constituted by the upper adaptor 21 and the lower adaptor 22 similarly to the first embodiment. A bag member 30 provided in the liquid container 1 is constituted by an upper film 32, a lower film 13, and the spout portion 14, and a shape of the upper film 32 is different from that in the first embodiment.

The upper film 32 in this embodiment has the same shape as that of the lower film 13, and a first handle forming portion and a second handle forming portion constituting the handle portion 10*c* are formed as the upper film 32 and the lower film 13, respectively. That is, the handle portion of this embodiment is constituted by overlapping the two sheet-shaped members and bonding them to each other. By constituting as above, rigidity of the handle portion can be improved as compared with the first embodiment, and handling performance at attachment to/detachment from the cassette 2 can be improved. This embodiment is particularly effective when the rigidity of the handle portion is to be improved in such a case that a material used for the sheet-shaped member is excessively soft, and a gap cannot be provided between the handle portion and the accommodating portion, even if the handle portion is formed of one sheet of film, for example. Moreover, according to this embodiment, since the upper film 32 and the lower film 13 have the same shape, the number of components to be manufactured can be reduced, and ease of manufacture increases.

Third Embodiment

Subsequently, a third embodiment according to the present invention will be explained. The third embodiment is different from the first embodiment in a point that it is so constituted that a lower film 43 is folded so that the handle portion is doubled. In the following explanation, portions different from those in the first embodiment will be mainly explained, while the same or similar members as those in the first embodiment are given the same signs, and the explanation will be omitted.

Figure 8:
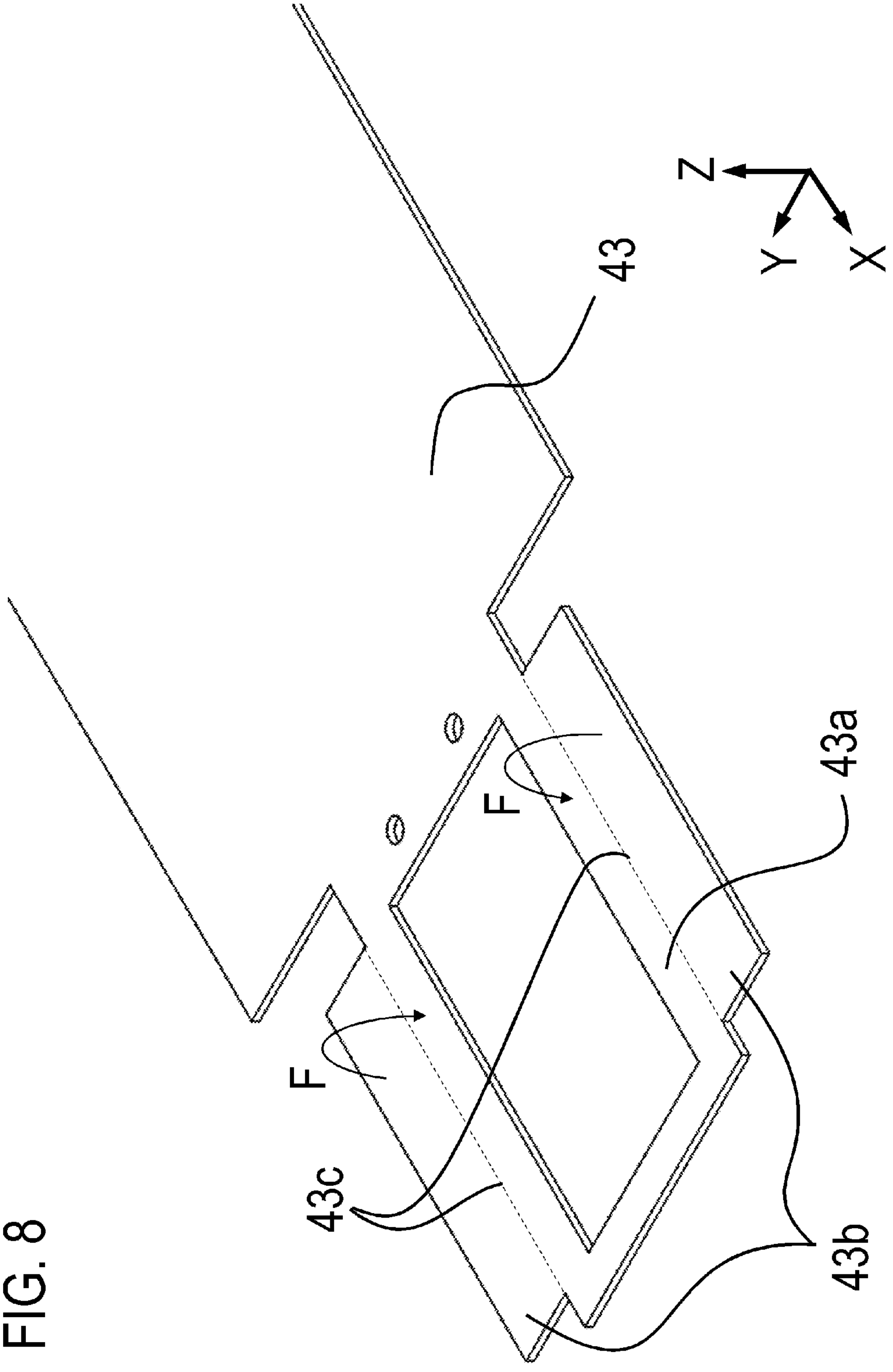
FIG. 8 is a perspective view illustrating a constitution of a sheet-state member according to a third embodiment.

FIG. 8 is a perspective view of the lower film 43 according to the third embodiment. A portion constituting the handle portion of the lower film 43 of this embodiment includes a base portion 43*a*, a folded portion 43*b* protruding in a width direction from both ends in the width direction with respect to the base portion 43*a* and a folding line 43*c*, which is a boundary between the base portion 43*a* and the folded portion 43*b* and extends in a longitudinal direction. In this embodiment, for the purpose of improvement of rigidity of the handle portion 10*c*, the folded portion 43*b* is folded with respect to the base portion 43*a* with the folding line 43*c* as a base line, and the base portion 43*a* and the folded portion 43*b* are bonded. In this embodiment, the folded and overlapped base portion 43*a* and the folded portion 43*b* become a folded-back portion which is folded back to the accommodating portion 10*a*, and the folded-back portion constitutes the handle portion 10*c*. By constituting as above, the rigidity of the handle portion can be improved similarly to the second embodiment, as compared with the first embodiment. Here, the constitution of the lower film 43 was explained, but the upper film, instead of the lower film 43, can also have the constitution similar to the lower film 43.

Application of the present invention is not limited to the embodiments described above, but various changes can be made. For example, it may be so constituted that the handle portion has threefold or fourfold sheet-shaped members by combining the second embodiment and the third embodiment. Moreover, in the above embodiment, the bag member was manufactured by using a film in which the handle portion and the accommodating portion are integral, but simply if accommodation efficiency of the liquid is to be improved, the handle portion may be bonded to the accommodating portion by means of welding or the like. That is, by providing the handle portion so as to oppose the surface on a side opposite to the contact surface with respect to the cassette of the accommodating portion, the constitution can have excellent handling performance when the liquid container is to be removed from the cassette, while the accommodation efficiency of the liquid is improved, as compared with the case where the handle portion is provided on the adaptor.

Figure 9B:
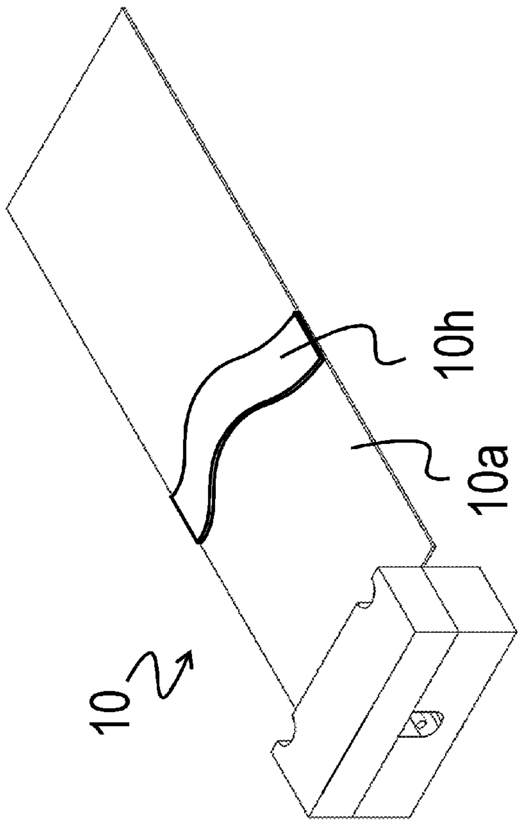
FIGS. 9A and 9B are perspective views of a liquid container according to a variation.
Figure 9A:
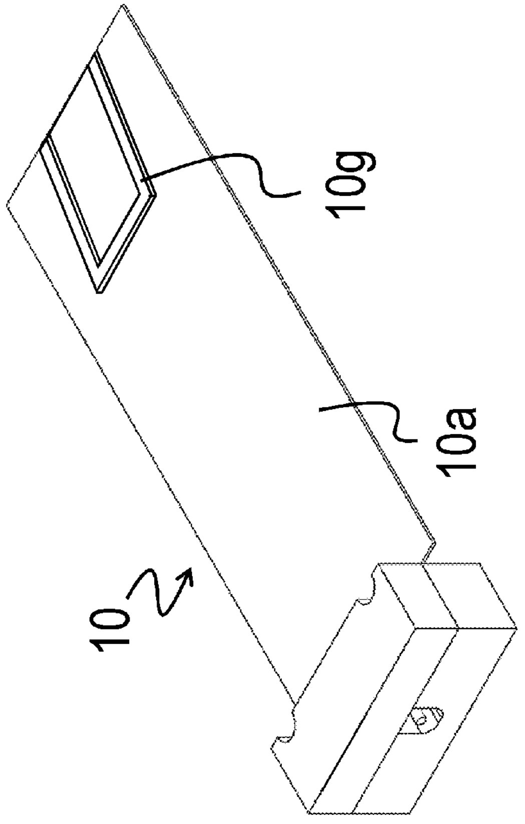

Moreover, another variation to which the present invention is applied will be explained by referring to FIGS. 9A and 9B. FIGS. 9A and 9B are perspective views illustrating a liquid container according to the variation. As shown in FIG. 9A, it may be so constituted as another variation that a handle portion 10*g* is provided on the end portion on a side opposite to the supply port 10*b* in the longitudinal direction of the bag member 10, for example. In the case of the constitution as above, the handle portion 10*g* is provided with a gap with respect to the accommodating portion 10*a* by giving a strong bending tendency or by providing a bonding member so that the folded portion does not return to a straight posture.

Alternatively, as shown in FIG. 9B, it may be so constituted that a handle portion 10*h* is provided across the width direction in the vicinity of the center in the longitudinal direction of the accommodating portion 10*a*. Such a constitution can be formed by forming a portion to become the handle portion 10*h* on either one of the upper film 12 and the lower film 13 in advance and by folding it so that a distal end is bonded to the accommodating portion. As described above, various changes can be made within a range not losing the identity with the invention embodied in the above embodiments, and in any case, a mass of the connecting member such as the adaptor is minimized, and the accommodation efficiency of the liquid can be improved.

According to the present invention, the liquid container with high liquid accommodation efficiency can be provided with a simple constitution.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-088866, filed on May 31, 2022, which is hereby incorporated by reference herein in its entirety.

What is claimed is:

1. A liquid container being able to be detachably attached to a case which is detachably attached to a liquid ejecting device and supplying a liquid to the liquid ejecting device, the liquid container comprising:

a bag-shaped liquid accommodating portion for containing a liquid, the liquid accommodating portion being configured by overlapping two sheet materials and sealing a peripheral edge of the two sheet materials, the two sheet materials including a first sheet material and a second sheet material;

a handle portion adjacent to the liquid accommodating portion and including an opening formed by cutting out a part of a region not containing liquid of the second sheet material;

a supply portion that is provided at one end of the liquid accommodating portion and that is provided so as to be capable of leading liquid from inside of the liquid accommodating portion to outside of the liquid accommodating portion, the supply portion being (1) sandwiched between the first sheet material and a portion of the second sheet material that forms one side edge of the opening, and (2) sealed between the two sheet materials; and an adapter that sandwiches and fixes the supply portion, the liquid accommodating portion, and a part of the handle portion in a state where the handle portion is folded back toward the liquid accommodating portion at a portion where the supply portion is disposed, and that positions the liquid accommodating portion and the supply portion with respect to the case, wherein the liquid accommodating portion includes an engaging portion engaged with the adapter.

2. The liquid container according to claim 1, wherein the handle portion extends so as to be gradually separated from the liquid accommodating portion as the handle portion extends from the one end of the liquid accommodating portion portion to toward another end of the liquid accommodating portion.

3. The liquid container according to claim 2, wherein the adapter includes two members facing each other so as to sandwich the supply portion, the liquid accommodating portion, and a part of the handle portion, and includes an inclined surface that defines a folding-back angle of the handle portion.

4. The liquid container according to claim 1, wherein the adapter includes an engaging portion that engages with an engaged portion of the case.

5. A liquid container being able to be detachably attached to a case which is detachably attached to a liquid ejecting device and supplying a liquid to the liquid ejecting device, the liquid container comprising:

a bag-shaped liquid accommodating portion for containing a liquid, the liquid accommodating portion being configured by folding a sheet material and sealing a peripheral edge of the sheet material;

a handle portion adjacent to the liquid accommodating portion and including an opening formed by cutting out a part of a region not containing liquid of the sheet material;

a supply portion that is provided at one end of the liquid accommodating portion and that is provided so as to be capable of leading liquid from inside of the liquid accommodating portion to outside of the liquid accommodating portion, the supply portion being sandwiched and sealed between (1) a first portion of the sheet material and (2) a second portion of the sheet material that forms one side edge of the opening; and an adapter that sandwiches and fixes the supply portion, the liquid accommodating portion, and a part of the handle portion in a state where the handle portion is folded back toward the liquid accommodating portion at a portion where the supply portion is disposed, and that positions the liquid accommodating portion and the supply portion with respect to the case, wherein the liquid accommodating portion includes an engaging portion engaged with the adapter.

* * * * *